(12) United States Patent
Szakálos et al.

(10) Patent No.: US 11,746,402 B2
(45) Date of Patent: Sep. 5, 2023

(54) MARTENSITIC STEEL

(71) Applicant: Blykalla reaktorer Stockholm AB, Stockholm (SE)

(72) Inventors: Peter Szakálos, Stockholm (SE); Peter Domstedt, Bromma (SE)

(73) Assignee: Blykalla Reaktorer Stockholm AB, Stockholm (SE)

( * ) Notice: Subject to any disclaimer, the term of this patent is extended or adjusted under 35 U.S.C. 154(b) by 0 days.

(21) Appl. No.: 17/760,051

(22) PCT Filed: Feb. 11, 2021

(86) PCT No.: PCT/SE2021/050105
§ 371 (c)(1),
(2) Date: Aug. 3, 2022

(87) PCT Pub. No.: WO2021/162616
PCT Pub. Date: Aug. 19, 2021

(65) Prior Publication Data
US 2023/0075136 A1 Mar. 9, 2023

(30) Foreign Application Priority Data

Feb. 11, 2020 (SE) .................... 2050144-1

(51) Int. Cl.
*C22C 38/58* (2006.01)
*C22C 38/00* (2006.01)
(Continued)

(52) U.S. Cl.
CPC .......... *C22C 38/58* (2013.01); *C22C 38/005* (2013.01); *C22C 38/02* (2013.01); *C22C 38/06* (2013.01);
(Continued)

(58) Field of Classification Search
CPC ......... C21D 6/004; C22C 38/00; C22C 38/08; C22C 38/40; C22C 38/44; C22C 38/48; Y02E 30/30
(Continued)

(56) References Cited

U.S. PATENT DOCUMENTS

| 3,131,055 A | 4/1964 | Isaac | |
|---|---|---|---|
| 4,498,928 A * | 2/1985 | Oden | C22C 38/40 420/47 |
| 8,431,072 B2 * | 4/2013 | Muralidharan | C22C 38/54 420/47 |

FOREIGN PATENT DOCUMENTS

| CN | 107587080 A | 1/2018 |
|---|---|---|
| EP | 2617856 A1 | 7/2013 |
| WO | 2016039679 A1 | 3/2016 |

OTHER PUBLICATIONS

International Search Report & Written Opinion, dated Apr. 1, 2021, Swedish Intellectual Property Office, Stockholm, Sweden.

\* cited by examiner

*Primary Examiner* — Jie Yang
(74) *Attorney, Agent, or Firm* — Noréns Patentbyrå AB

(57) ABSTRACT

The invention relates to a steel for structural components used at elevated temperatures. The steel comprises the following main components (in wt. %): Cr 8.0-14.0 Ni 4.0-14.0 Al 2.5-5.0 C 0.003-0.3 N≤0.06 Mo+W≤4.0 at least one of: Nb 0.01-1.0 Ta 0.01-1.0 Ti 0.01-1.0 Zr 0.01-1.0 Hf 0.01-1.0 Y 0.05-1.0 balance optional elements, Fe and impurities; and the steel composition fulfilling the following condition: Cr(eq)+Ni(eq)≤30; where Cr(eq)=Cr+2Al+1.5(Si+Nb+Ti)+Mo+0.5W; and Ni(eq)=Ni+10(C+N)+0.5(Mn+Cu+Co).

6 Claims, 1 Drawing Sheet

Figure 1:
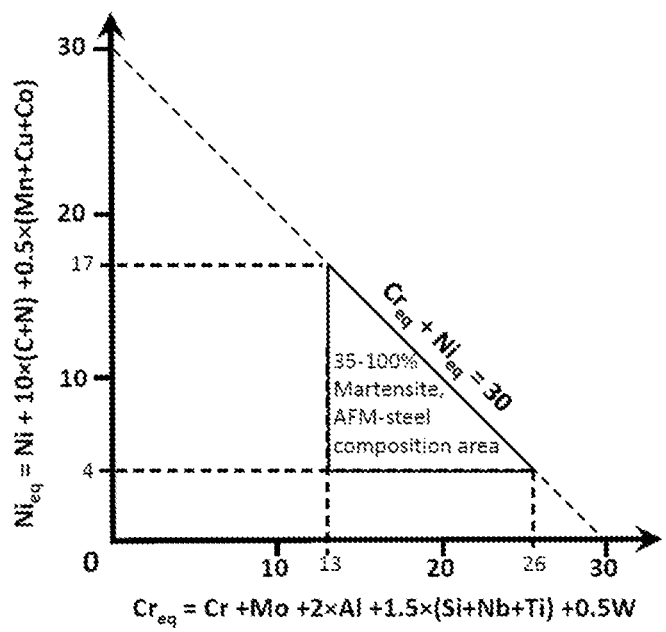

(51) Int. Cl.
*C22C 38/02* (2006.01)
*C22C 38/06* (2006.01)
*C22C 38/42* (2006.01)
*C22C 38/48* (2006.01)
*C22C 38/50* (2006.01)
*F28F 21/08* (2006.01)

(52) U.S. Cl.
CPC .............. *C22C 38/42* (2013.01); *C22C 38/48* (2013.01); *C22C 38/50* (2013.01); *F28F 21/083* (2013.01)

(58) Field of Classification Search
USPC ........................................................... 420/40
See application file for complete search history.

MARTENSITIC STEEL

TECHNICAL FIELD

The invention relates to an oxidation resistant steel suitable for structural components used at high temperatures.

The invention further relates to a heat exchanger structural component comprising such a steel.

BACKGROUND OF THE INVENTION

Ferritic alumina forming FeCrAl-steels are known for their excellent high temperature oxidation and corrosion resistance. However, ferritic steels do not possess the mechanical strength desired for a construction material, especially for components exposed to high loads, such as heat exchangers and steam generators. In more recent years, alumina forming austenitic (AFA) steels, with sufficient creep properties at high temperatures, have been developed. However, due to the slower diffusion of oxide forming species, such as Cr and Al, in the austenitic steels structure, ferritic materials are, by nature, superior regarding the oxidation and corrosion properties.

The low carbon martensitic structure is very similar to that of the ferritic structure, which results in comparable diffusion properties. Interestingly, it has been shown that aluminium diffuses faster in a steel with martensitic structure than in a similar steel with ferritic structure, thus indicating that the oxidation properties might even be better in alumina forming martensitic steels (AFM) than for FeCrAl-steels. Also, martensitic steels have, in general, higher creep strength than the austenitic steels. However, the corrosion resistant martensitic steels available today are, at best, chromia formers and normally not intended for high temperature use, i.e. the martensitic precipitation-hardening stainless steels (17-4 PH etc) have a maximum service temperature of around 350° C. Therefore, there has been a lack of suitable material candidates for the combination of both high temperature and high load components which are needed for instance in future high efficiency power generation technologies.

By producing an Alumina Forming Martensitic (AFM) steel, this invention combines the excellent oxidation and corrosion resistance provided by the alumina scale and the excellent high temperature mechanical properties of the martensitic structure, at least up to 650° C.

CN107587080 A disclose a precipitation-strengthened, heat-resistant steel comprising: C: 0.03-0.06%, Ni: 6-10%, Cr: 8-13%, Al: 1.5-2.4%, Co: ≤3%, Nb: ≤0.1%, Zr: ≤0.1%, and the balance is Fe. It teaches that, when the Al content in the alloy is low, the strength is significantly poorer and the toughness is not significantly improved, and when the Al content is too high, the toughness of the alloy drops sharply.

DISCLOSURE OF THE INVENTION

The main object of the present invention is to provide an aluminium alloyed steel, which is suitable for use in load bearing applications at high temperatures, such as energy production and energy conversion.

Another object of the present invention is to provide a steel for the use in structural components in a liquid metal cooled nuclear reactor or in a concentrated solar power plant.

The foregoing objects, as well as additional advantages are achieved to a significant measure by providing a steel having a composition and structure as set out in the alloy claims.

The inventive alloys form protective Al-rich oxides in similar manner as on FeCrAl alloys, or better. It is shown that the AFM-steel have even better oxidation resistance than the best FeCrAl-steels in very corrosive environments such as liquid lead with high amount of dissolved oxygen.

The steel is suitable for a heat exchanger structural component, in particular a heat exchanger (HX) tube, more particularly a steam generator (SG) tube.

The invention is defined in the claims.

DETAILED DESCRIPTION

The importance of the separate elements and their interaction with each other as well as the limitations of the chemical ingredients of the claimed alloy are briefly explained in the following. All percentages for the chemical composition of the steel are given in weight % (wt. %) throughout the description. Upper and lower limits of the individual elements can be freely combined within the limits set out in the claims.

Chromium is to be present in a content of at least 8% in order to provide a good oxidation and corrosion resistance. Cr is a ferrite stabilizing element, which reacts with carbon to form carbides. Cr also favours protective alumina scale formation by the so-called "third-element effect".

If the chromium content is too high, this may lead to the formation of undesired brittle phases at lower temperatures such as 400-600° C. The chromium content is therefore limited to 13%. The lower limit may be 8.5%, 9.0% 9.5%, 10.0%, 10.5% or 11.0%. The upper limit may be 11%, 11.5%, 12.0% or 12.5%.

Nickel is an austenite stabilizer and its primary purpose is to stabilize the austenitic phase at high temperature, i.e. at the austenitization temperature, in order to reach sufficient amount of martensite upon cooling (quenching). The amount of Ni necessary depends on the amount of ferrite stabilizing elements and the amount of other austenite stabilizers. It is possible do control the ductility by nickel in AFM-steels, increased Ni gives increased ductility until the structure do not favour any martensite formation upon cooling. Depending on the steel composition, the Ni content have an upper limit to avoid too much stabilised austenite at room temperature, i.e. formation of too little martensite. The lower limit may therefore be 4.0%, 4.5%, 5.0%, 5.5%, 6.0%, 6.5% 7.0%, 7.5%, 8.0%, 8.5% or 9.0% and the upper limit may be 9.0%, 9.5%, 10.0%, 10.5%, 11.0%, 11.5%, 12.0%, 12.5%, 13.0%, 13.5% or 14.0%.

Aluminum is essential for the formation of the Al-rich oxides and is therefore added in an amount of 2.5-5%. However, too much Al may result in the formation of undesired brittle phases. Aluminum is beneficial in case of ferrite precipitation at low temperatures such as 400-500° C., since it suppresses phase separation (α'-formation) and spinodal decomposition. The lower limit may therefore be 2.5%, 2.6%, 2.7% 2.8% and the upper limit may be 4.5%, 4.75% or 5%.

Carbon is always present in steels, it forms carbides and stabilizes the austenite and is paramount for the martensite formation upon cooling/quenching. C, i.e. carbides, are also important to minimize the grain growth upon cooling from melting or recrystallisation temperatures in AFM-steels. The upper limit for carbon may be set to 0.3%, 0.25%, 0.2% 0.15%, 0.10%, 0.09%, or 0.06%. The lower limit may be as low as 0.003% or 0.03% depending on the boron and nitrogen contents.

Nitrogen may be present in the steel in an amount of ≤0.06% because N reacts with Al. N may also form precipitates with V, Nb, Ti, Zr and Y and is beneficial for strength and creep resistance.

Molybdenum and Tungsten increases the high temperature mechanical properties and is a strong carbide forming element and also a strong ferrite former and may result in the formation of brittle Laves phase. Addition of W and Mo increases the creep properties and may aid retaining the lath martensitic structure. The amount of molybdenum and tungsten should be restricted to maximum 4%, preferably to 3% or less. If the alloy composition is prone to lave phase precipitation, the higher limit may be 3%, 2.5%, 2%, 1.5%, 1%, 0.5% or 0.1%.

Niobium and Tantalum forms carbides, nitrides and carbo-nitrides and is beneficial for strength and creep resistance. In addition, Nb tends to improve the oxidation resistance in the same way as REM. Nb and Ta is therefore present, individually, in an amount of 0.01-1%, preferably 0.01-0.5%.

Ti, Zr & Hf

Reactive elements that promote formation of a protective alumina scale. Strong carbide formers and strong oxide particles formers, beneficial for high temperature mechanical properties when alloying with oxygen, so called ODS alloys.

The amount of Ti, Zr & Hf, individually, may be 0.01-1%. If alloyed with oxygen, the preferred amount is 0.5-1% (ODS). If no oxygen is deliberately added, the amount may be 0.1-0.7%.

Yttrium

Reactive elements that promote formation of a protective alumina scale. Strong carbide formers and strong oxide particles formers, beneficial for high temperature mechanical properties when alloying with oxygen, so called ODS alloys.

The amount of Y may be 0.01-1%. If alloyed with oxygen, the preferred amount is 0.5-1% (ODS). If no oxygen is deliberately added, the amount may be ≤0.5%.

Silicon is beneficial for high temperature oxidation properties but forms brittle phases in higher content and should thus be limited. The upper limit may be 1.0%, 0.6%, 0.55%, 0.5%, 0.45%, 0.4% or 0.35%.

Manganese

Strong austenite stabilizer and may to some extent replace Ni. Mn also improves the mechanical properties to some extent. Mn is included in carbides as well as oxides. Mn tends to promote secondary phases, such as sigma phase, which may cause embrittlement. The Mn content should be limited to ≤4% for some alloy compositions, but preferably ≤3% for alloy compositions sensitive to sigma phase. The upper limit may be 3%, 2.5%, 2.0%, 1.5%, 1% or 0.5%.

Copper is an optional element, which has an austenite stabilizing effect but it may form brittle phases, especially under irradiation. It is not possible to extract copper from the steel once it has been added. This drastically makes the scrap handling more difficult. For this reason, copper is normally limited to 3%, preferably ≤0.3%. Most preferably, Cu is not deliberately added.

Cobalt

The Co-content should be as low as possible in nuclear applications but for other application it is beneficial in stabilizing an austenitic structure and improves the strength at all temperatures. In compositions aimed for nuclear applications, the amount is preferably ≤0.1%. In compositions where Co is deliberately added, the amount may be ≤2%. The upper limit may be 2, 1.5, 1.0, 0.5, 0.3, or 0.1.

Vanadium forms carbides and carbonitrides of the type M(C,N) and Z-phase in the matrix of the steel. However, if stronger carbide formers are present, than the V amount should be ≤0.3%. In other cases, the V amount may be ≤1%.

Sulphur

Sulphur should not deliberately be added, lowers the oxidation properties.

Boron

Boron may act as a substitution to carbon but is also a strong neutron absorber. Boron may increase the creep strength in martensitic steels by reducing the coarsening of carbides at higher temperatures. Boron suppresses the nucleation of ferrite on austenitic grain boundaries. The amount of B may be ≤0.1%, but preferably ≤0.01% depending on the carbon content.

Bi, Se, Ca, Mg

These elements may be added to the steel in the claimed amounts in order to further improve the machinability, hot workability and/or weldability.

Oxygen

In combination with oxygen active elements such as Y and RE in general, form small oxide particles, beneficial for high temperature mechanical properties, so called ODS-alloys. In the case of ODS alloying, the O amount may be ≤0.5%, but preferably 0.05-0.15%. In non-ODS alloys, O should not be deliberately added.

RE Improves the oxide scale properties and are beneficial for high temperature mechanical properties in combination with oxygen, so called ODS-alloys. (Rare Earth Metals) as used in this application embraces the elements with atomic numbers 21 and 57-71 because Yttrium is defined separately. The amount of RE may be ≤0.3%.

The steel composition should further fulfil the following conditions in terms of Cr- and Ni-equivalents (in weight-%):

$$Cr(eq)+Ni(eq) \leq 30;$$

where $$Cr(eq)=Cr+2Al+1.5(Si+Nb+Ti)+Mo+0.5W; \text{ and}$$

$$Ni(eq)=Ni+10(C+N)+0.5(Mn+Cu+Co).$$

The steel preferably having at least 35 vol-% martensite structure. The composition region for the AFM-steels as a function of Cr- and Ni-equivalents is shown in FIG. 1.

Example

In the present examples, two commercial steels are compared with the inventive steel. The two commercial steels are the alumina forming FeCrAl steel and the Stainless Steel, AISI 316L.

The inventive steel was casted in a high frequency induction furnace, approximately 100 g per patch. The heats were then hot rolled into 200 mm×10 mm strips in a total of 8 steps, followed by annealing at 1100° C. for 15 min and air cooling to room temperature. Compositions of the investigated alloys are shown in Table 1.

TABLE 1

Elemental compositions of some example of tested alloys. All values are given in wt %.

| Alloy | Fe | Cr | Ni | Al | Mn | Mo | Si | Nb | C | Cu | Ti | RE |
|---|---|---|---|---|---|---|---|---|---|---|---|---|
| AISI 316L | Bal. | 17 | 10 | — | 1 | 2 | 0.5 | — | 0.02 | 0.4 | — | — |
| FeCrAl | Bal. | 10-22 | — | 4-5 | — | — | 0.15 | — | — | — | <0.1 | <0.2 |
| Inventive steel | Bal. | 11 | 6 | 3.0 | 2.6 | — | 0.3 | 0.03 | 0.10 | — | 0.33 | <0.3 |

All alloys were cut into samples measuring roughly 30×10 mm, with varying thicknesses deepening on initial shape. All samples were polished to remove any initial oxides using Struers abrasive SiC paper (final step #500) and finally cleaned in ethanol and ionised $H_2O$.

The experiment was conducted in a COSTA (COrrosion test stand for STagnant liquid lead Alloys) setup, constructed by Karlsruhe Institute of Technology (KIT). Samples were fitted into alumina crucibles using alumina holders as support and then filled with lead. All crucibles were subsequently placed on nickel trays and placed inside the sealed quartz tubes of the furnace. More information on the COSTA setup is presented in J. Nucl. Mater. 278(2000) 85-95.

Two environmental conditions were chosen, using lead as liquid metal as one condition and the other exposure using steam. The oxygen concentration in the liquid lead was controlled by means a gas mixture containing Ar, $H_2$ and $H_2O$. The $H_2/H_2O$ ratio was set to approximately $10^{-3}$, which corresponds to $10^4$ wt. % oxygen dissolved in the lead. A ZIROX SGM5 oxygen analyser was used to monitor the oxygen partial pressure at the systems gas outlet. The steam exposure was also carried out in the COSTA facility where inert Ar-gas was added to stabilise the gas flow in the furnace. The two corrosion tests, lasting 820 hours for the lead exposure and 680 hours for the steam exposure, were both carried out at 550° C.

Prior to the exposures, cross sections were prepared by polishing one side with approximately a 45° of each sample to a final step of #4000. The samples were then cleaned with ethanol and ionised $H_2O$, followed with drying using pressurized air. Representative example of results from the liquid lead and steam exposures can be seen in FIGS. 2 and 3 respectively.

Figure 2:
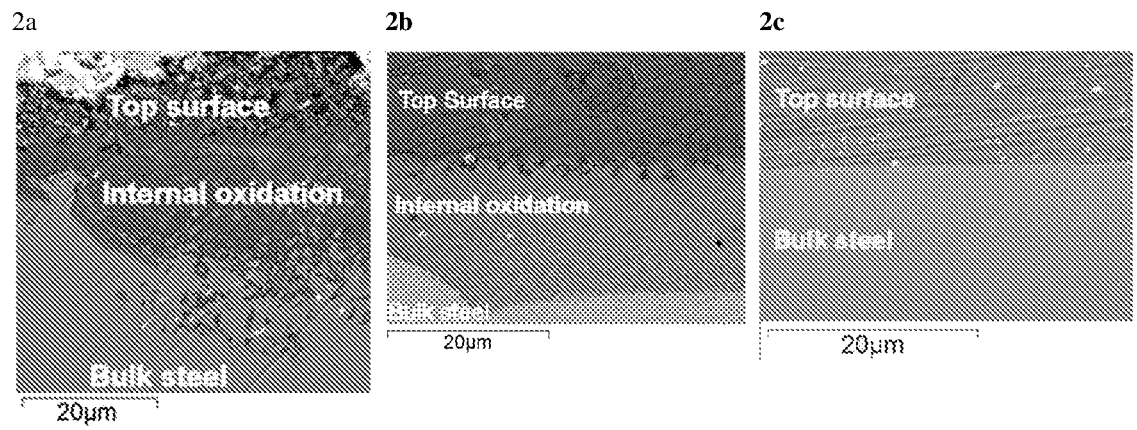

FIG. 2 is an example of a very aggressive corrosion test performed in liquid lead at 550° C. for 820 hours with very high oxygen concentration, i.e. close to the formation of PbO. SEM cross-section in 45° showing the top surface and the steel sample interior. This test initiated severe oxidation on chromia forming steels such as AISI 316L (a), but also on the normally oxidation resistant FeCrAl-alloys, both commercial as well as on the newly developed Fe10Cr4Al-RE suffered from internal oxidation (b). The only steel that formed a protective alumina scale vas the newly developed AFM-steel (c).

Figure 3:
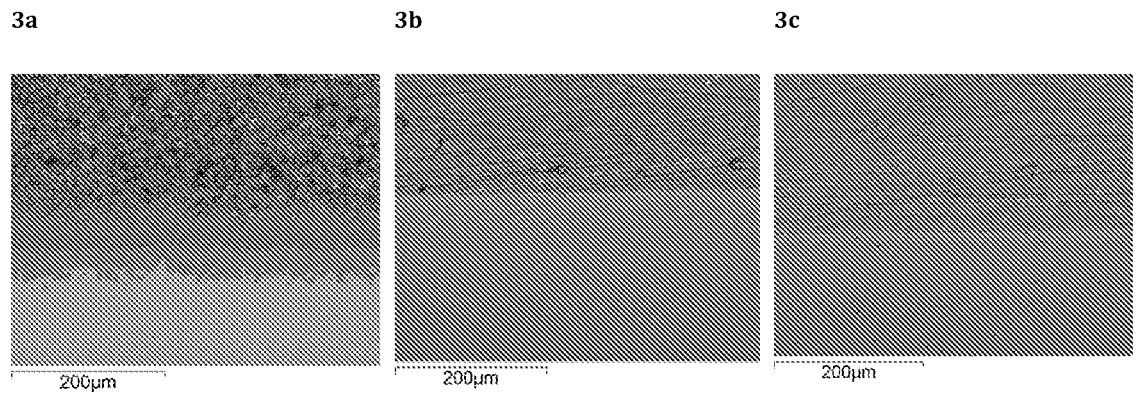

FIG. 3 is a test in a less aggressive environment, i.e. steam+argon for 680 h at 550° C. SEM cross-section in 45° showing the top surface and the steel sample interior. The chromia forming steel, AISI 316L, suffered from internal oxidation, reaching 50 μm in depth, and was covered with a thick non-protective oxide layer on the surface. The FeCrAl steel (b) and the AFM-steel (c) performed equally good with a fully protective oxide scale on the entire surface.

Both the chromia forming steels such as 316L and FeCrAl-alloys suffered from internal oxidation and were covered with thick oxide layer on the top surface, when tested in a very corrosive environment, i.e liquid lead with high oxygen partial pressure. The depth of internal oxidation was roughly 50 μm for both samples. However, the 316L sample also suffered from liquid metal dissolution and lead penetration to some extent, which is most likely due to selective dissolution of Ni. Since Ni is an austenite stabilizer, dissolution this element can cause phase transformation from austenite (FCC) to ferrite (BCC).

The inventive steel is, as the FeCrAl steel, an alumina former. However, while the FeCrAl steel was covered with non-protective internal and external oxides, the inventive steel has formed a very thin and protective scale. Although the oxide scale is very thin and cannot be distinguished with the SEM and sample preparation used, it is evident that it has been formed as no lead has penetrated into the material. Also, there were no detectable oxidation or corrosion products on the entire studied cross-section, which speaks for a very protective nature of the oxide scale.

Both the FeCrAl and the inventive steels mange to form alumina rich oxide scales in the steam environment with no observable corrosion or oxidation attacks. The chromia forming 316L sample, however, suffered from heavy internal and external oxidation of approximately 50 μm and 40 μm, respectively.

The results from the two exposures are summarized in Table 2.

TABLE 2

Summary of the result from liquid lead and steam exposures.

| | Liquid Lead | | | Steam | | |
|---|---|---|---|---|---|---|
| Alloy | P.O | D.A. | I.O. | P.O. | D.A. | I.O. |
| 316L | No | 50 μm | 50 μm | No | No | 50 μm |
| FeCrAl-steels | No | No | 50 μm | Yes | No | No |
| Inventive steel | Yes | No | No | Yes | No | No |

P.O.—Protective oxide.
D.A.—Dissolution attack.
I.O.—Internal Oxidation.

It is evident from Table 2 that the only alloy that managed to form a protective oxide cover in both experiments was the inventive steel, which also did not suffer from any dissolution attacks. Accordingly, the claimed alloy is considered to have very attractive properties for use as structural components in contact with liquid metals, such as lead, or steam or both. Similar corrosion tests in liquid lead have been performed up to 650° C. with different oxygen content with the same results, i.e. the inventive AFM-steel have a oxidation resistance that is equal or better than the best FeCrAl-steels within this temperature range.

The invention claimed is:

1. A steel comprising of in weight % (wt. %):

Cr 8.0-14.0
Ni 4.0-14.0
Al 2.5-5.0
C 0.003-0.3
N≤0.06
Mo+W≤4.0
at least one of:
  Nb 0.01-1.0
  Ta 0.01-1.0
  Ti 0.01-1.0
  Zr 0.01-1.0
  Hf 0.01-1.0
  Y 0.05-1.0
  optionally
  Si≤2.0
  Mn≤ 4.0
  Cu≤ 4
  Co≤2
  V≤1
  B≤0.1
  Bi≤0.2
  Se≤ 0.3
  Ca≤ 0.01
  Mg≤ 0.01
  O 0.02-0.50
  RE≤ 0.3
balance Fe apart from impurities, wherein the content of RE does not include the amount of Y but only the amount of the elements having the atomic number 21 and/or any one of the atomic numbers 57-71;
the steel composition fulfills the following condition:

$$Cr(eq)+Ni(eq) \leq 30;$$

where $$Cr(eq)=Cr+2Al+1.5(Si+Nb+Ti)+Mo+0.5W; \text{ and}$$

$$Ni(eq)=Ni+10(C+N)+0.5(Mn+Cu+Co); \text{ and}$$

wherein the steel has at least 35 vol-% martensite structure.

2. The steel according to claim 1, wherein Al is 2.6-5.0 wt. %.

3. The steel according to claim 1, wherein Co≤ 0.1 wt. %.

4. A heat exchanger structural component comprising the steel according to claim 1.

5. The heat exchanger component according to claim 4, wherein heat exchanger structural component is a heat exchanger (HX) tube.

6. The heat exchanger component according to claim 4, wherein heat exchanger structural component is a steam generator (SG) tube.

* * * * *